US006617377B2

(12) United States Patent
Chacko

(10) Patent No.: US 6,617,377 B2
(45) Date of Patent: Sep. 9, 2003

(54) RESISTIVE NANOCOMPOSITE COMPOSITIONS

(75) Inventor: Antony P. Chacko, Granger, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/999,625

(22) Filed: Oct. 25, 2001

(65) Prior Publication Data

US 2003/0100653 A1 May 29, 2003

(51) Int. Cl.[7] ............................ C08K 3/04; C08K 5/20; C08K 5/06; C08K 5/10; C08K 3/08

(52) U.S. Cl. ......................... 524/99; 524/233; 524/296; 524/377; 524/439; 524/440; 524/495; 524/496

(58) Field of Search .......................... 524/99, 233, 296, 524/377, 439, 440, 495, 496

(56) References Cited

U.S. PATENT DOCUMENTS

| | | | | |
|---|---|---|---|---|
| 5,111,178 | A | 5/1992 | Bosze | 338/160 |
| 5,781,100 | A | 7/1998 | Komatsu | 338/252 |
| 5,883,173 | A | 3/1999 | Elspass | 524/446 |
| 6,060,549 | A | 5/2000 | Li et al. | 524/445 |
| 6,172,595 | B1 | 1/2001 | Komatsu | 338/160 |
| 6,184,280 | B1 | 2/2001 | Shibuta | 524/405 |

*Primary Examiner*—Peter Szekely
(74) *Attorney, Agent, or Firm*—Mark P. Bourgeois

(57) ABSTRACT

A resistive composition for screen printing onto a substrate. The resistive composition, based on total composition has a) 5–30 wt. % of polymer resin, b) greater than 0 up to and including 10 wt. % of thermosetting resin, c) 10–30 wt. % conductive particles selected from the group consisting of carbon black, graphite and mixtures thereof and d) 0.025–20 wt. % carbon nanoparticles, wherein all of (a), (b), (c) and (d) are dispersed in a 60–80 wt. % organic solvent.

20 Claims, No Drawings

RESISTIVE NANOCOMPOSITE COMPOSITIONS

BACKGROUND OF THE INVENTION

1. Field of the Invention

This invention generally relates to polymer thick film conductive compositions containing nanomaterials. In particular, the invention is directed to such compositions, which are suitable for making variable resistive elements such as those used in position sensing elements.

2. Description of the Related Art

Electrically resistive polymer thick film compositions have numerous applications. Polymer thick film (PTF) resistive compositions are screenable pastes which are used to form resistive elements in electronic applications. Such compositions contain conductive filler material dispersed in polymeric resins which remain an integral part of the final composition after processing.

Resistive compositions are used as resistive elements in variable resistors, potentiometers, and position sensor applications. A resistive element is, in most cases, printed over a conductive element which acts as a collector element. In position sensing applications, a metallic wiper slides over the resistive element. The wiper can slide back and forth for several million cycles over the collector and resistive elements during the lifetime of the electronic component. For accurate position sensing, the wiper should give continuous electrical output throughout the life of the sensor.

The durability of these position sensing elements depends on the mechanical properties of both the resistor and the conductive film. The polymer thick films tend to wear out after several million cycles of sliding with a metallic contactor over the elements at extreme temperature conditions typically seen in an environment such as an automotive engine compartment. Therefore, polymer resistive and conductive compositions having excellent mechanical properties and wear resistance are required for performance and signal output in these applications.

In addition to good mechanical properties, these materials should also have good thermal properties. Polymer thick films show a decrease in storage modulus as temperature is increased. A sharp decrease in mechanical properties is observed near the glass transition temperature. In addition to loss in modulus, these materials also tend to show an increase in coefficient of thermal expansion, which increases significantly above the glass transition temperature (Tg). When used in, for example, motor vehicles, a position sensor is exposed to high temperatures in under the hood applications. At these temperatures resistive elements show a high rate of wear due to a decrease in modulus properties. In addition to the surrounding temperature, a still higher temperature is observed at the interface between the metallic wiper and the resistive element surface due to frictional heating. In some cases, these temperatures can approach the glass transition temperature (Tg) of the resistive material and can cause loss of the material's mechanical properties, which adversely affect signal output.

A prior art resistor composition is as follows:

Prior Art Composition

| Component | Weight (%) |
|---|---|
| Polyamide imide | 21.0 |
| Carbon black | 5.3 |
| N-methyl pyrrolidone | 73.7 |

One way to improve mechanical properties of a resistive film is to incorporate fillers, such as short fibers, in these films. The presence of fibers of relatively large dimension creates an electrically heterogeneous surface. This results in non-linear electrical output in contact sensor applications. Even when the size of the fibers is in the order of a few microns, the surface is still electrically and mechanically heterogeneous. A dither motion at high frequency on a surface region where these fibers are absent can create large wear. Another problem with using fibers with greater than 10 volume percentage is that it can significantly wear the metallic contactor. This wear is accelerated if these fibers are protruding from the surface. Therefore, there is a need in the art for resistor elements with enhanced mechanical and thermal properties while exhibiting homogeneous surface electrical characteristics.

SUMMARY OF INVENTION

According to a preferred embodiment of the invention, a resistive composition for screen printing onto a substrate is provided. The resistive composition, based on total composition, has a) 5–30 wt. % of polymer resin, b) greater than 0 up to and including 10 wt. % of thermosetting resin, c) 10–30 wt. % conductive particles selected from the group consisting of carbon black, graphite and mixtures thereof, and d) 1–20 wt. % carbon nanoparticles, wherein all of (a), (b), (c) and (d) are dispersed in a 60–80 wt. % organic solvent.

The present invention relates to an improved nanocomposite resistive composition comprising a polymeric resin and dispersed nanomaterials having conductive fillers and potentially anti-friction additives, with the dispersed nanomaterials being present in an amount less than 30% by weight of the cured nanocomposite films. The nanomaterials are preferably selected from carbon nanotubes, vapor grown nanofibers, milled carbon fibers, nanoclays, and molecular silica.

The invention provides increased mechanical, wear, electrical, and thermal properties of the resistor materials by incorporating the nanomaterials into the resistive composition. The large surface to volume ratio of the materials imparts significant interfacial strength to the composites. The functions of nanoparticles and nanofibers are to increase the polymer-filler interactions. The large surface area of these nanomaterials significantly interacts with functional groups in the macromolecular chains. These interactions in the molecular and nanoscale increases the microhardness and nano-hardness properties of these materials. These micro and nanohardness properties are very important for the sliding contact applications. The homogeneity of the nanocomposite film increases the toughness and hardness uniformly. Forming a resistor surface with molecularly dispersed fibers or other so called nanomaterials of submicron size in accordance with the invention can create an electrically and mechanically homogeneous surface which enables a consistent and durable electrical output to be established. The molecular silica materials and nanoclay can provide increased thermal properties. The carbon fibrils provide increased electrical and mechanical properties. A composition containing carbon nanofibers and molecular silica materials provide enhanced wear resistance, enhanced thermal properties, and enhanced electrical properties.

The invention provides a decrease in contactor wear by either avoiding the use of relatively large carbon fibers or by using a very small concentration of very finely milled carbon fibers in conjunction with nanoparticles and nanofibers. Due to the large surface to volume ratio, nanoparticles and nanofibers need to be used in less than 5 volume percentage. This significantly reduces the tendency of the contactor to prematurely wear.

The invention creates a resistor surface with a homogeneous electrical and mechanical surface in nanoscale. During a high frequency small stroke dither test, the contactor will always be sliding on a mechanically tough nanocomposite surface. In contrast, the high frequency small stroke dither test on a composition of prior art can gouge and pit a resistor surface where the carbon fibers are absent.

The invention decreases the coefficient of thermal expansion (CTE) of the resistor material. Wear of resistor materials typically is significantly increased at high temperature. One of the reasons for this phenomenon is the increased expansion of the material. By incorporating molecular silica, nanoclay, and nanofibers, molecular scale interactions with the polymer matrix are achieved. These strong interactions in nanoscale decrease the CTE of the material. In contrast, significantly large amount of fibers would be needed to be added to a polymer matrix to decrease the matrix's thermal expansion coefficient. As mentioned earlier, adding a large amount of carbon fibers to the matrix can significantly wear the associated metallic contactor.

The invention uses high glass transition temperature polymers, which form secondary bonding with the nanomaterials. The polymer matrix resin is selected from any high performance thermoplastic or thermosetting resins. The functional groups in the polymers should have good interactions with the nanoparticles. For instance, polyimide, polyamideimide, phenolic, Diallyl Isophthalate (DAIP), Epoxy, Bismaleimide, etc can be used in acccordance with the invention.

Additional objects, features and advantages of the invention will become more readily apparent from the following detailed description of preferred embodiments thereof.

DETAILED DESCRIPTION OF THE PREFERRED EMBODIMENTS

According to preferred embodiment of the invention, a resistive composition for screen printing onto a substrate will now be described. In particular, the composition includes polymer components, nanomaterials components, electrically conductive components and other additives. The composition is carried by an organic vehicle. The details of all these components, its method of preparation, and associated printing procedures are discussed below.

Polymer Components

Polymers with functional groups capable of forming secondary bonding with nanoparticles and nanofibers are preferred for these compositions. In addition to the functional groups, they should also have a high glass transition temperature. It is critical for some high temperature applications, such as automotive applications, that these materials maintain a high storage modulus during the use and lifetime of the materials. The polymer components used in the present invention comprise 5–30 wt. % of a high Tg polymer selected from polyimides, polyamide imides, polysulfones, polyphenylenes, polyether sulfones, polyarylene ethers, polyphenylene sulfides, polyarylene ether ketones, phenoxy resins, polyether imides, polyquinoxalines, polyquinolines, polybenzimidazoles, polybenzoxazoles, polybenzothiazoles, phenolic, epoxy, diallyll isophthalate copolymers thereof, and mixtures thereof, etc based upon total composition. In addition to this polymer, 0–10% of another thermosetting polymer can be used. The choice of the second polymer depends on the application, as will be discussed more fully below. The second polymer can be selected from aromatic cyanate ester, epoxy, phenolic, diallyl isophthalate, bismaleimide, polyimide, etc. The polymers are dissolved in an organic solvent. The percentage compositions are based upon total composition.

In the electrically resistive composition of the present invention, the polymer is used in the range of 5–30 wt. % by weight of the conductive composition, with a more preferred range of 15–20 wt. %. If less than 5 wt. % resin is used, the resulting conductive composition has been found to have poor screen printing properties, as well as weak mechanical properties and poor adhesion. If more than 30 wt. % is used, the resulting composition has a lower than desirable electrical conductive property.

An optional second polymer is sometimes added to increase the interfacial bonding between nanomaterials and the matrix resin. The second polymer is preferably a high temperature thermosetting polymer and is used in the range of 0–10 wt. %. The amount of this resin in the composition is determined by the application requirements. Increasing the amount of the second thermosetting polymer decreases flexibility, but improves temperature performance at high temperature. Depending on the amount of the second polymer, the cured film can either behave as a molecular composite, a semi-interpenetrating network, or an immiscible blend. This versatility in morphology can be judiciously chosen for a given application.

Nanomaterials Components

The mechanical and thermal properties of these resistive films can be increased by incorporating materials of nanodimensions in the resistive compositions. The nanoparticles and nanofibers of the present invention can be selected from carbon nanotubes, vapor grown carbon nanofibers, milled carbon fibers, molecular silica, nanoclay, and the like. Nanoparticles and nanofibers may be pretreated or preprocessed to obtain better dispersion of these materials. The particle size of these materials can be sometimes tailored for a given application. One of the methods to reduce and control particle size of vapor grown carbon fibers and milled carbon fibers is by milling them in a ball mill using a steel media. The medium for milling can be judiciously chosen to get very small particle size and to control particle size. The nanoparticles and nanofibers can be pretreated by using suitable materials in the milling medium. The medium for milling can also be monomers, oligomers, surface active agents, surface active chemicals, solvents, etc. The nanoparticles are used in the range of 0.025–20 wt % of the composition. A preferred range is 0.1–7 wt %.

In accordance with the invention, resistive nanocomposite compositions are polymer thick film compositions for which at least one dimension of the dispersed particles is in the nanometer range. Carbon nanotubes are strand-like fibers.

Individual single-walled carbon nanotubes (SWNT) have a typical diameter in the range of 1–2 nm. Vapor grown carbon fiber (VGCF) is highly crystalline fine carbon fiber synthesized by the vapor-phase method. VGCF is similar to fullerene tubes in the nanoscale domain of initial formation and the highly graphitic structure of the initial fibril. VGCF is produced as a mass of tangled fibers, each of which has a diameter of about 100 nanometer and a length ranging from 50 to 100 microns or longer. Milled carbon fibers are random short length fibers made from PAN or pitch which are 5–8 $\mu$m in diameter and have an average length of about 30 $\mu$m. The particle size of these milled fibers can be fibers can be reduced to submicron range by ball milling. The nanoclay particles are layered silicates, wherein the layer thickness is around 1 nanometer and the lateral dimension of the layers vary from 0.3 nanometers to several microns. Molecular silica is derived from a class of chemicals known as polyhedral oligomeric silsesquioxanes (POSS) and polyhedral oligomeric silicates. POSS molecules are physically large with an approximate size range of 0.7 to 50 nm.

Electrically Conductive Component

The electrically conductive component of the present invention comprises finely divided particles of electrically conductive materials such as carbon black, graphite, silver, copper, nickel or mixtures thereof. This includes mixtures of the metallic and carbon powders. The preferred particles are carbon black. The preferred conductive particles comprise 1–25 wt. % of the conductive composition, with a most preferred range of 1–10 wt. %. The preferred carbon black is commercially available from Degusaa Corporation.

Other Additives

Antifriction additives such as fluoropolymers and graphite are preferably used to decrease the friction between the resistive nanocomposite film surface and the sliding contact. The antifriction additives comprise 1–20 wt. % of the resistive composition, with a preferred range of 5–10 wt. %. The preferred fluropolymer is commercially available from Dupont.

Wetting agents such as fluorinated oligomers may be added to the composition for wettability and leveling properties. Up to 1 wt. % of a fluorinated surfactant may be used. The fluorinated oligomers are commercially available from 3M Corporation.

Organic Vehicle

An organic solvent of 20–40 wt. % is used to dissolve the resistive composition. The preferred solvent used is N-methyl pyrrolidone. The selection of the solvent is based on the good solubility of the polymer in this solvent. This solvent also has a high boiling point. Low evaporation of the solvent is preferred for continuous printing operation where no change in viscosity of the composition due to loss of solvent is desired. The polymer is dissolved completely in the organic vehicle prior to blending with the other components. N-methyl pyrrolidone is commercially available from BASF Corporation.

General Composition Preparation and Printing Procedures

In the preparation of an exemplary composition of the present invention, a polymer solution is made by mixing 10–20 wt. % of a polymer and 0–10 wt. % thermosetting resin in 60–80 wt. % N-methyl pyrrolidone based upon total composition. The polymer is mixed with both the conductive and nano-particles to form a paste with fine particle size. At this point, surfactants and rheological additives may be added if desired to modify the properties of the resistive composition. The paste is mixed in a ball mill for several hours. Other methods of mixing could be used, such as employing high-speed shear to thoroughly blend the particles in the polymer binder. However, ball milling is preferred for preparing resistive composition with uniform particle size. The particle size range and viscosity of the paste is monitored to get a resistive paste suitable for application in position sensors. The milling time and milling quantity on the ball mill determines the final particle distribution, size and resulting rheology.

The resulting component sizes are as follows:

| Component | Size |
|---|---|
| Molecular silica | less than 100 nm |
| Nanoclay | less than 100 nm in one dimension |
| Carbon nanotubes | less than 100 nm in one dimension. |
| Vapor grown carbon nanofibers | between 50 nm to 10 micron in one dimension |
| Milled carbon fibers | between 100 nm to 10 micron in one dimension |

The resistive paste thus prepared is applied to substrates such as polyimide, ceramic and fiber reinforced phenolic substrates by conventional screen printing processes. A preferred substrate is polyimide. The wet film thickness typically used for position sensor application is 40 microns. The wet film thickness is determined by the screen mesh and screen emulsion thickness. A preferred screen mesh of 250 is used for obtaining smooth resistive film on a polyimide substrate for position sensors. The paste is then air dried and cured resulting in a resistive film on the substrate.

EXAMPLES

The present invention will be described in further detail by giving practical examples. The scope of the present invention, however, is not limited in any way by these practical examples.

All component concentrations are expressed as percentage by weight.

Example 1

| Component | Weight (%) |
|---|---|
| Polyamide imide | 20.0 |
| Carbon black | 5.0 |
| Vapor grown carbon fiber | 5.0 |
| N-methyl pyrrolidone | 70 |

Example 2

| Component | Weight (%) |
|---|---|
| Polyamide imide | 20.2 |
| Carbon black | 4.9 |
| Vapor grown carbon fiber | 4.9 |
| Milled carbon fiber | 0.7 |
| N-methyl pyrrolidone | 69.3 |

Example 3

| Component | Weight (%) |
|---|---|
| Polyamide imide | 20.0 |
| Carbon black | 5.0 |
| Molecular Silica | 5.0 |
| N-methyl pyrrolidone | 70 |

Example 4

| Component | Weight (%) |
|---|---|
| Polyamide imide | 20.0 |
| Carbon black | 5.0 |
| Nanoclay | 5.0 |
| N-methyl pyrrolidone | 70 |

Example 5

| Component | Weight (%) |
|---|---|
| Polyamide imide | 20.7 |
| Carbon black | 5.1 |
| Molecular silica | 2.5 |
| Milled carbon fiber | 0.7 |
| N-methyl pyrrolidone | 71.0 |

Example 6

| Component | Weight (%) |
|---|---|
| Polyamide imide | 20.7 |
| Carbon black | 5.1 |
| Nanoclay | 2.5 |
| Milled carbon fiber | 0.7 |
| N-methyl pyrrolidone | 71.0 |

Example 7

| Component | Weight (%) |
|---|---|
| Polyamide imide | 17.36 |
| Carbon black | 7.92 |
| Carbon nanotubes | 6.25 |
| Graphite | 4.77 |
| Wetting agent | 0.17 |
| N-methyl pyrrolidone | 63.53 |

Example 8

| Component | Weight (%) |
|---|---|
| Polyamide imide | 18.0 |
| Carbon black | 5.0 |
| Carbon nanotubes | 3.0 |
| Molecular Sililca | 2.0 |
| N-methyl pyrrolidone | 72.0 |

Example 9

| Component | Weight (%) |
|---|---|
| Polyamide imide | 18.0 |
| Carbon black | 5.0 |
| Carbon nanotubes | 3.0 |
| Milled carbon fiber | 2.0 |
| N-methyl pyrrolidone | 72.0 |

Example 10

| Component | Weight (%) |
|---|---|
| Polyimide | 20.0 |
| Carbon black | 5.0 |
| Vapor grown carbon nanofiber | 3.0 |
| Nanoclay | 2.0 |
| N-methyl pyrrolidone | 70.0 |

Example 11

| Component | Weight (%) |
|---|---|
| Polyamide imide | 17.16 |
| Carbon black | 4.35 |
| Graphite | 6.61 |
| Vapor grown carbon nanofiber | 4.47 |
| Milled carbon fiber | 1.0 |
| Diallyl isopthalate | 1.0 |
| N-methyl pyrrolidone | 65.4 |

Example 12

| Component | Weight (%) |
|---|---|
| Polyimide | 19.3 |
| Carbon black | 6.7 |
| Nanoclay | 4.3 |
| Milled carbon fiber | 6.0 |
| N-methyl pyrrolidone | 63.6 |

Example 13

| Component | Weight (%) |
|---|---|
| Phenolic | 19.3 |
| Bismaleimide | 6.7 |
| Carbon black | 3.6 |
| Nanoclay | 0.7 |

-continued

| Component | Weight (%) |
|---|---|
| Milled carbon fiber | 6.0 |
| N-methyl pyrrolidone | 63.6 |

Example 14

| Component | Weight (%) |
|---|---|
| Polyamide imide | 17.16 |
| Diallyl isopthalate | 4.12 |
| Carbon black | 7.84 |
| Vapor grown carbon fiber | 4.47 |
| Milled carbon fiber | 1.0 |
| N-methyl pyrrolidone | 65.4 |

Example 15

| Component | Weight (%) |
|---|---|
| Polyimide | 19.3 |
| Carbon black | 6.7 |
| Vapor grown carbon nanofiber | 6.0 |
| Nanoclay | 4.3 |
| N-methyl pyrrolidone | 63.6 |

Example 16

| Component | Weight (%) |
|---|---|
| Polyimide | 22.9 |
| Carbon black | 6.7 |
| Carbon nanofiber | 0.7 |
| Milled carbon fiber | 6.0 |
| N-methyl pyrrolidone | 63.6 |

Materials Sources

Polyamideimide can be obtained from Amoco Corp.
Polyimide can be obtained from Dupont Corp.
Phenolic can be obtained from Borden chemicals Corp.
Diallylyl isopthalate can be obtained from DAISO Corp.
Aromatic cyanate ester can be obtained from Lonza Corp.
Carbon Nanotubes can be obtained from Carbolex Corp.
Vapor grown carbon nano fibers can be obtained from Applied Sciences Corp.
Milled carbon fibers can be obtained from Zoltech Corp.
Graphite can be obtained from Degusaa Corp.
Carbon black can be obtained from Degusaa Corp.
Wetting agent can be obtained from 3M Corp.

Electrical Testing

The film resulting from the composition of the present invention was tested for electro-mechanical wear properties. A palladium metal wiper was moved repeatedly back and forth across the film to simulate the motion as used in a potentiometer. After 2 million cycles of wiping at −40 C. to 135 C. temperature ranges, the test samples were measured for peak correlation output noise. In the test, two films or tracks were measured. The electrical output from two resistive tracks on the substrate were measured and correlated to determine a correlation output noise.

Correlation output noise is given by:

$$C = \left(\frac{V_a}{V_{app}} + \frac{V_b}{V_{app}}\right) - \left(\frac{V_{a\_index}}{V_{app}} + \frac{V_{b\_index}}{V_{app}}\right)$$

Where:

C is the correlation.

$V_a$ and $V_b$ are the output voltage of the Track A and Track B, respectively.

$V_{app}$ is the applied voltage.

$V_{a\_index}$ and $V_{b\_index}$ are the output voltage of the Track A and Track B, respectively, at a low-end mechanical stop as provided by the test system.

The wear area was measured by a Tencor P-10 surface profilometer and the wear scar area was examined visually using an optical microscope. Wear ratings are given by combining both observations. Wear results are shown in Table 1.

TABLE 1

Electrical and wear properties of position sensing elements prepared from the compositions

| Examples | Peak correlation output noise (%) | Wear Rating (1 = best, 10 = worst) |
|---|---|---|
| Prior Art | 56.75 | 7 |
| Example 1 | 7.74 | 3 |
| Example 2 | 1.71 | 1 |

It is noted that the wear properties of the films prepared using the composition of the present invention are greatly improved over the prior art. In addition, the measured peak correlation output noise is greatly reduced.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A resistive composition, based on total composition, comprising:

a) 5–30 wt. % of polymer resin;

b) 10–30 wt. % conductive particles selected from the group consisting of carbon black, graphite, silver, copper, nickel and mixtures thereof;

c) 0.025–20 wt. % nanoparticles; and d) a 60–80 wt. % organic solvent, wherein the polymer resin, conductive particles and nanoparticles are dispersed in the organic solvent.

2. The resistive composition of claim 1 wherein the polymer resin is chosen from the group consisting of polyimides, polyamide imides, polysulfones, polyphenylenes, polyether sulfones, polyarylene ethers, polyphenylene sulfides, polyarylene ether ketones, phenoxy resins, polyether imides, polyquinoxalines, polyquinolines, polybenzimidazoles, polybenzoxazoles, polybenzothiazoles, phenolic, epoxy and diallyll isophthalate.

3. The resistive composition of claim 1 wherein the conductive particles are selected from the group consisting of carbon black, graphite, silver, copper, nickel and mixtures thereof.

4. The resistive composition of claim 1 further comprising greater than 0 up to and including 10 wt. % of a thermosetting resin.

5. The resistive composition of claim 4 wherein the thermosetting resin is selected from the group consisting of aromatic cyanate ester, epoxy, phenolic, diallyl isophthalate and bismaleimide.

6. The resistive composition of claim 1 wherein the nanoparticles are chosen from the group consisting of nanotubes, nanofibers and mixtures thereof.

7. The resistive composition of claim 1 wherein the nanoparticles include 0.1–5 wt. % of molecular silica.

8. The resistive composition according to claim 7, wherein the molecular silica has a particle size less than 100 nanometers.

9. The resistive composition of claim 1 wherein the nanoparticles include 0.1–5 wt. % of nanoclay.

10. The resistive composition according to claim 9, wherein the nanoclay has a particle size less than 100 nanometers in one dimension.

11. The resistive composition of claim 1 wherein the nanoparticles are carbon nanotubes which constitute 1–7 wt. % of the resistive composition.

12. The resistive composition according to claim 11, wherein the carbon nanotubes have a particle size less than 100 nanometers in one dimension.

13. The resistive composition according to claim 6, wherein the carbon nanofibers are vapor grown and have a particle size range of 50 nanometers to 10 microns in one dimension.

14. The resistive composition according to claim 6, wherein the carbon nanoparticles are milled carbon fibers that have a particle size range of 100 nanometers to 10 microns in one dimension.

15. The resistive composition of claim 1 wherein the nanoparticles are selected from the group consisting of vapor grown carbon nanofibers, milled carbon fibers and mixtures thereof.

16. The resistive composition of claim 15 further comprising greater than 0 up to and including 10 wt. % of a thermosetting resin.

17. The resistive composition according to claim 1, wherein the organic solvent is selected from the group consisting of N-methyl pyrrolidone, diallyl pthalate, glycol ether and dimethyl formamide.

18. The resistive composition according to claim 1 wherein the polymer resin constitutes 15–20 wt. % of the resistive composition.

19. The resistive composition of claim 1 wherein the conductive particles constitute 15–20 wt. % of the resistive composition.

20. The resistive composition of claim 1 wherein the nanoparticles constitute 0.1–7 wt. % of the resistive composition.

* * * * *